Figure 1:
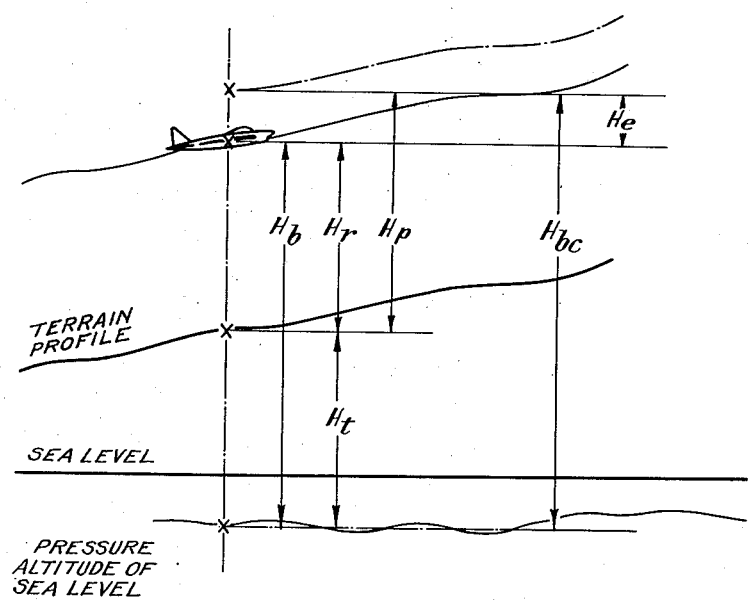

Oct. 8, 1957  W. J. BERNHART  2,809,340
AIRCRAFT CLEARANCE CONTROL SYSTEM
Filed Dec. 12, 1955  2 Sheets-Sheet 1

INVENTOR
WALTER J. BERNHART
BY
ATTORNEY

Oct. 8, 1957   W. J. BERNHART   2,809,340
AIRCRAFT CLEARANCE CONTROL SYSTEM
Filed Dec. 12, 1955   2 Sheets-Sheet 2
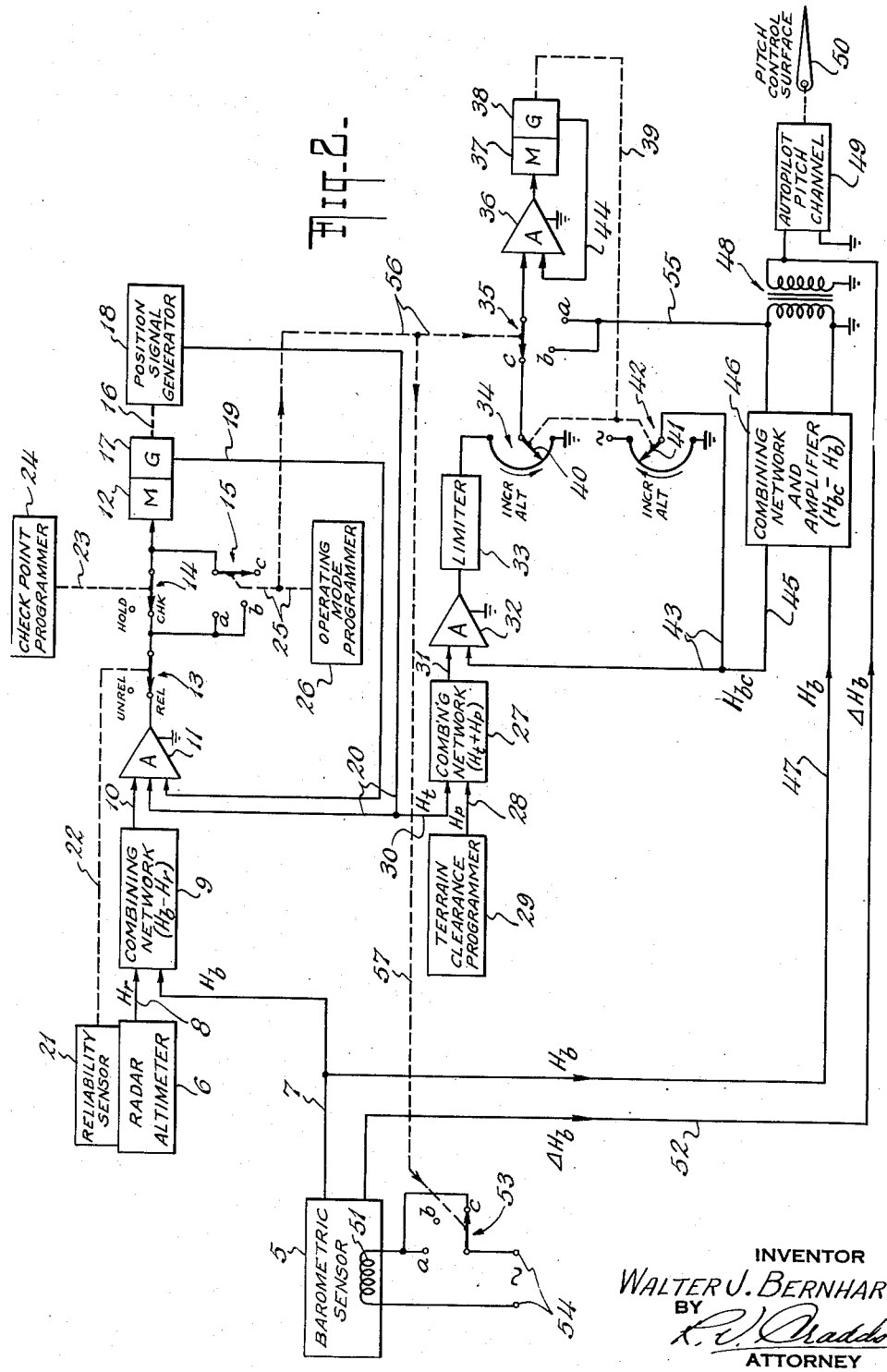
INVENTOR
WALTER J. BERNHART
BY
ATTORNEY

United States Patent Office 2,809,340
Patented Oct. 8, 1957

2,809,340

AIRCRAFT CLEARANCE CONTROL SYSTEM

Walter J. Bernhart, Mount Vernon, N. Y., assignor to Sperry Rand Corporation, a corporation of Delaware Application December 12, 1955, Serial No. 552,663

11 Claims. (Cl. 318—489)

This invention relates to flight control systems for aircraft. More particularly, it concerns a novel system for controlling an aircraft to fly at commanded heights or clearances above the earth's surface.

In the present system, clearance commands are transformed into pressure altitude commands so that a comparison may be made between the latter and the actual pressure altitude of the craft, whereby to supply an error signal for controlling the clearance of the craft to substantially equal that which is commanded.

Periodically, the pressure altitude commands are corrected for the variations that occur in the pressure altitude of sea level from place to place. Such variations occur normally along virtually any route the craft may pursue, and also occur due to abnormal disturbances such as local thunder squalls and the like.

If a step-like change occurs in a clearance command, the resulting change in the pressure altitude command is nevertheless caused to take place gradually, so that the craft is not placed in a dangerous pitch attitude, but is placed in a safe pitch attitude that is dependent on the craft's particular pressure altitude.

In fulfilling its function of clearance control, the present system is operated in a mode designated as its Clearance Control Mode. Another mode of operation, designated Keeper Mode, is employed to control the craft to keep the pressure altitude it has when this mode is initiated. A third mode of operation is designated as the Nulling Mode, and is provided for nulling the output of the system so that the craft may be controlled by other means. If the system is operated from its Nulling Mode to its Clearance Control Mode or Keeper Mode, or vice versa, no control transient is thereby produced.

The principal object of the present invention is to provide a novel system for controlling an aircraft to fly at commanded heights or clearances above the earth's surface.

Another object is the provision of a novel surface clearance control system for aircraft wherein clearance commands received by the system are transformed into pressure altitude commands so that a comparison may be made between the latter and the actual pressure altitude of the craft.

Another object is to provide a system according to the foregoing object wherein periodic corrections for variations in the pressure altitude of sea level from place to place are made in the pressure altitude commands.

Another object is the provision of a novel surface clearance control system for aircraft wherein the craft is controlled in response to command signals to fly from one clearance above the earth's surface to another clearance thereabove at a safe pitch attitude regardless of the difference between the two clearances and the abruptness with which the command signals change.

Another object is to provide a novel flight control system that may be operated in one operating mode thereof to control an aircraft to fly at commanded clearances above the earth's surface, and in another operating mode to control the craft to keep a given pressure altitude, without producing a control transient when changing from one mode to the other.

Another object is the provision of a novel surface clearance control system that may be operated in one operating mode thereof to control an aircraft to fly at commanded clearances above the earth's surface, and in another operating mode to produce no control, there being no control transient produced when the system is changed from one operating mode to the other.

Another object is to provide an aircraft control system having earth's surface clearance control, pressure altitude keeping, and null output modes of operation, any one of which may be entered from either of the other two without producing a system output transient.

With the foregoing and other objects in view, the present invention includes the novel elements and the combinations and arrangements thereof described below and illustrated in the accompanying drawings, in which Fig. 1 is a diagram depicting an aircraft in flight and showing the different height parameters involved in the present invention in their relation to the position of the aircraft; and Fig. 2 is a schematic diagram of a preferred embodiment of the present invention.

In its Clearance Control Mode of operation, the present system computes the height $H_t$ of the local surface or terrain above the local sea level pressure altitude (see Fig. 1) by subtracting the aircraft's height $H_r$ above the local terrain (radio-derived) from the aircraft's pressure altitude $H_b$ (barometrically-derived) preferably during selected spaced intervals of time. Following each such interval, the computed height of terrain $H_t$ is added in a computer apparatus to a commanded-terrain clearance or height-above-terrain $H_p$ to give a reference pressure altitude $H_{bc}$. The computer apparatus employed for adding provides a smooth transition from one reference pressure altitude to another notwithstanding an abrupt or step-like change in the commanded terrain clearance $H_p$. The rate at which the transition takes place is controlled in direct accordance with the difference between the two pressure altitudes, provided, however, that this difference does not exceed a given limit therefor. If the limit is exceeded, the rate is controlled according to such limit irrespective of how much the difference exceeds the same. At all times, the transition rate is also controlled inversely in accordance with the instantaneous level of the $H_{bc}$ output of the adding computer apparatus, so that the transition rate is decreased as the reference pressure altitude increases, and vice versa. The reference pressure altitude output, $H_{bc}$, of the computer apparatus is compared with the aircraft's barometrically-derived pressure altitude, $H_b$, and any difference $H_e$ between the two is employed to control the craft through the pitch channel of its autopilot in a manner to eliminate such difference. After each interval of computation of height of terrain, $H_t$, such computation is held until the beginning of the next succeeding interval of terrain height computation.

If the radio instrument supplying the height or clearance $H_r$ of the aircraft above local terrain includes a switch-opening device adapted to operate when the overall signal-to-noise ratio of the instrument drops below a safe operating level, the device may be employed in a manner to cause the present system in its Clearance Control Mode of operation to hold the last reliable computation of height of terrain $H_t$ should the radio instrument be unreliable during an interval of terrain height computation.

The Nulling Mode of operation is provided for rendering the present system ineffective to control the aircraft, yet effective at the same time to maintain the system in continued readiness for assuming control when such is desired without thereby causing a control transient. More specifically, in this mode the computed height of terrain $H_t$ and the commanded terrain clearance $H_p$ are effectively removed from control, and the reference pressure altitude output then existing is rapidly varied to match the aircraft's pressure altitude, whereby to provide a null output from the system. Thus, the Nulling Mode of operation permits the pitch control of the aircraft to be taken over by means other than the present system, such as, for example, a ground-based radio transmitter adapted to control pitch during the launching of the aircraft.

For its Keeper Mode of operation, the system is arranged in the same manner as for its Nulling Mode, except that the barometric sensing instrument supplying the aircraft's pressure altitude data (which is nulled out by the reference pressure altitude data) is also caused to supply data representing the changes $\Delta H_b$ that take place in the craft's pressure altitude $H_b$ during the Keeper Mode of operation. This change data is supplied to the craft's autopilot to restore the craft to the pressure altitude existing when the keeper mode of operation is invoked; hence, a pressure altitude "keeping" action is provided.

Referring now to Fig. 2, it will be seen how the foregoing functions are brought into concrete existence by a preferred embodiment of the present invention. A barometric sensor 5 provides the signal proportional to the pressure altitude $H_b$ of the craft, and a radar altimeter 6 provides the signal proportional to the terrain clearance $H_r$ of the craft. The $H_b$ and $H_r$ signals are fed via leads 7 and 8, respectively, to a combining network 9 which subtractively combines the signals to provide the resultant signal proportional to the height $H_t$ of the terrain above sea level pressure altitude (apparent sea level).

The $H_t$ signal output of network 9 is fed via a lead 10 to the input of an amplifier 11 whose output is connected to or disconnected from a motor 12, depending on the relative states of actuation of three switches 13, 14, 15. Switches 13, 14 are single-pole double-throw switches, one state of actuation of which is open and the other closed. Switch 15 is a single-pole, triple-throw switch, two states of actuation of which are closed and the third open. Switch 14 is connected across switch 15 so that when switch 13 and one of switches 14, 15 are closed, motor 12 is connected to receive the output of amplifier 11. If switch 13 opens, or if both of switches 14, 15 open, the output of amplifier 11 is disconnected from motor 12, thereby to hold the motor's output linkage 16, including reduction gearing, at the then existing angular position thereof.

A rate generator 17 is drivably connected to the motor shaft, and a position signal generator 18 is also drivably connected to the shaft through linkage 16 so that generators 17, 18 provide electrical signals respectively proportional to the rate and amount of change of the mechanical output of motor 12. The rate signal is fed back to amplifier 11 via a lead 19 and the position signal is fed back via a lead 20, so that when switch 13 and one of switches 14, 15 are closed, motor 12 is driven at a rate and in an amount proportional to the $H_t$ signal output of network 9, thereby to gradually reproduce such output on lead 20.

Switch 13 is provided for interrupting the response of the servo loop formed of amplifier 11, motor 12, and generators 17, 18 whenever conditions are such that the $H_r$ output of radar altimeter 6 is unreliable. To this end, altimeter 6 preferably includes a reliability sensor 21 responsive to the over-all signal to noise ratio of the altimeter and adapted by a mechanical connection 22 to open switch 13 when this ratio falls below a predetermined safe level of reliability.

Switch 14 is provided for programming a "hold" condition, while switch 15 serves as an interlock for preventing the programming of a "hold" condition during modes of system operation other than the Clearance Control Mode. Thus, during the Nulling Mode and the Keeper Mode, the movable arm of switch 15 makes contact with contacts "a" and "b," respectively, to close the switch and by-pass the switch 14. However, during the Clearance Control Mode, the movable arm of switch 15 makes contact with a dead contact "c" to open the switch and render the switch 14 effective to complete the $H_t$ servo loop when the movable arm of switch 14 is in its "check" or closed position and to open the loop when the arm is in its "hold" or open position, assuming that reliability switch 13 is closed.

The movable arm of switch 14 is arranged to be actuated through an actuating linkage 23. Preferably, a programmer device 24 operates linkage 23 so that switch 14 is periodically closed for spaced, relatively short intervals of time and is opened for the intervening longer periods. In this regard, device 24 may be adapted to respond to switch-command data prerecorded on tape driven relative to a pickoff head in the device.

The movable arm of switch 15 is arranged to be actuated through an actuating linkage 25. Preferably, a programmer device 26 operates linkage 25 so that switch 15 is actuated according to a predetermined plan. In this regard, device 26 may be similar to device 24 in being responsive to tape recorded command data. The plan, for example, may be to call for the Nulling Mode (switch position "a") during the launching of the aircraft so as to permit an outside control source such as a radio "beep" station to control the elevation of the craft, to be followed successively by the Keeper Mode (switch position "b") and the Clearance Control Mode (switch position "c"), the latter being the principal mode of operation of the system.

The clearance command signal $H_p$ is furnished to a combining network 27 via a lead 28 from a programmer device 29 preferably controlled by taped commands to provide the requisite electrical output. Network 27 also receives the $H_t$ signal on feedback lead 20 via a lead 30, and additively combines the $H_p$ and $H_t$ signals to provide an output signal proportional to the sum of the terrain clearance that is commanded and the height of the terrain above apparent sea level. This terrain height, hence the sum output of network 27, is based on the apparent sea level existing just prior to a programmed opening of switch 14 from its "check" position to its "hold" position.

The sum output of network 27 represents the pressure altitude command ($H_t + H_p = H_{bc}$) corresponding to the terrain height command $H_p$. Provision is made for reproducing the $H_{bc}$ signal gradually so that the system calls for a safe rate of change of elevation when a change is commanded. To this end, the output of network 27 is connected via a lead 31 to an amplifier 32 whose output is fed via a limiter 33, a variable voltage-divider 34, and a contact "c" of a three-position switch 35 to an amplifier 36 connected to energize a motor 37. Motor 37 drives a rate generator 38 similar to generator 17, and is drivably connected by way of a linkage 39, including reduction gearing, to the wiper arm 40 of divider 34 and to the wiper arm 41 of a second variable voltage-divider 42. The winding of divider 42 is connected across a source of fixed potential, and wiper arm 41 is connected via a lead 43 in negative feedback relation to amplifier 32 so that motor 37 is driven through an angular distance proportional to the $H_{bc}$ signal on amplifier input lead 31. However, the rate at which motor 37 is driven, hence the rate at which the feedback signal on lead 43 is changed to ultimately equal and wipe out the $H_{bc}$ signal on lead 31, is limited by the joint action of limiter 33 and divider 34 and by a rate feedback signal to amplifier 36 via a lead 44 from generator 38.

The winding of divider 34 is connected across the output of limiter 33, and the wiper arm 40 thereof is so driven that decreasing portions of the limiter's output appear on arm 40 for such movements of linkage 39 that produce signals on wiper arm 41 of divider 42 representing increasing pressure altitude commands. The feedback signal provided by rate generator 38 to amplifier 36 controls the speed of motor 37 in proportion to the output of divider 34. By this arrangement with switch 35 on contact "c," the ($H_t+H_p$) signal input to amplifier 32 is gradually reproduced on lead 43 at a rate directly in accordance with the magnitude of the difference between such amplifier input and the output of divider 42 and inversely in accordance with the output alone of divider 42, the signal reproduction rate varying in this manner until the difference magnitude exceeds the value at which limiting begins in limiter 33, whereupon further variations in the then existent rate are solely in inverse accordance with the output of divider 42. The limiting value of limiter 33 and the downward and upward adjustments made in the output of the limiter by divider 34 in response to increasing and decreasing pressure altitude command signals on lead 43, respectively, are such as to prevent the system from ever calling for an unsafe rate of climb or descent, as the case may be. Instead, changes in elevation of the craft from one pressure altitude to another in response to a programmed terrain clearance command are commanded at a rate having a safe upper limit tailored to the pressure altitude of the craft.

The pressure altitude command signal or $H_{bc}$ signal generated on lead 43 by divider 42 is fed via a connection 45 to a combining network-amplifier apparatus 46 where it is subtractively combined with the $H_b$ signal generated on lead 7, which $H_b$ signal is fed to apparatus 46 via a connection 47. The resulting control signal output of apparatus 46 is proportional to the difference or error $H_e$ between the pressure altitude that is commanded by the signal on leads 43, 45 and the actual pressure altitude of the craft, and is coupled via a transformer 48 to the input of the pitch channel 49 of an automatic pilot for positioning a pitch control surface 50. Channel 49 may, for example, comprise a simple position follow-up servomechanism. Thus, surface 50 is positioned so as to change the elevation of the craft at the rate called for by the $H_{bc}$ signal on leads 43, 45 until the difference between actual and commanded pressure altitudes is substantially eliminated.

Barometric sensor 5 is preferably of the well-known force-balancing type, wherein a servomotor having a fixed field winding 51 responds to amplified signals fed to the sensor motor's control winding from an aneroid-driven pickoff to vary a resilient force in a manner to balance the pressure force exerted by the aneroid. The angular position of the sensor motor's shaft represents the static air pressure relative to a reference static pressure corresponding to apparent sea level, and an electrical signal proportional to the pressure altitude $H_b$ relative to this apparent sea level or sea level pressure altitude is produced by a position signal generator connected to the shaft. By removing the excitation from field winding 51, the force-balancing action is halted, and the signal from the aneroid pickoff, fed via a lead 52 to pitch channel 49, thereafter is proportional to the departures $\Delta H_b$ from the then existent pressure altitude. Irreversible linkage means are employed in sensor 5 in the usual manner to prevent the resilient balancing force from changing further once the excitation for winding 51 is removed.

A three-position switch 53 is arranged to connect a source of exciting potential from a pair of terminals 54 across the barometric sensor's motor field winding 51 when the movable arm of switch 53 meets contacts "a" and "c" of the switch, and is arranged to disconnect the source when the arm meets contact "b" of switch 53. Contacts "a" and "b" of switch 35 are connected via a lead 55 to the output of apparatus 46 so that when the movable arm of the switch is moved from its contact "c," the input to amplifier 36 is switched from divider 34 to this output. Thus, with all three of the switches 15, 35, 53 in their "a" condition of actuation, arm 41 of divider 42 is driven by motor 37 to produce a signal on leads 43, 45 that wipes out the $H_b$ signal on lead 47, thereby to produce a continuous null output from apparatus 46. The connection provided by contact "a" of switch 35 bypasses limiter 33 and divider 34 so that the speed of motor 37 is considerably more rapid than the speed thereof during the Clearance Control Mode, whereby the nulling rate is proportionately greater than the rate at which the $H_{bc}$ signal is generated.

With all three switches 13, 35, 53 in their "b" condition of actuation, everything is the same as in the "a" condition, except that the $\Delta H_b$ signal on lead 52 from barometric sensor 5 is no longer nulled out within the sensor by the force-balancing action of the sensor. Thus, the $\Delta H_b$ signal becomes proportional to the departures of the craft from the pressure altitude existing at the time the "b" condition is actuated. Pitch channel 49 responds to the $\Delta H_b$ signal fed thereto via lead 52 to cause the craft to keep this pressure altitude.

In order that all three switches 15, 35, 53 may be actuated simultaneously to their respective "a," "b," or "c" condition, depending on the system operating mode programmed by programmer 26, a mechanical connection 56 is run from the output linkage 25 of programmer 26 to the movable arm of switch 35, and a mechanical connection 57 is run from connection 56 to the movable arm of switch 53. Thus, when the Nulling Mode is programmed, all the switches are actuated to their "a" condition. And when the Keeper Mode and Clearance Control Mode are programmed, all the switches are actuated, respectively, to their "b" and "c" conditions.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A flight control system for controlling an aircraft to attain a preselected clearance from the earth's surface and to thereafter maintain said preselected clearance, said system comprising barometric sensing means for providing a first signal proportional to the altitude of said craft above apparent sea level, said apparent sea level differing from actual sea level according to deviations in local atmospheric pressure from a given reference pressure for said barometric means, radio means for providing a second signal proportional to the clearance of said craft from the earth's surface, first computing means responsive to said first and second signals for providing a third signal proportional to the altitude of the earth's surface above said apparent sea level, means for providing a fourth signal proportional to said preselected clearance, second computing means responsive to said third and fourth signals for generating a fifth signal proportional to the sum of the earth's surface altitude and said preselected clearance, means connected to said barometric sensing means and said second computing means for providing a control signal proportional to the difference between said craft altitude and said sum of surface altitude and clearance, and means responsive to said control signal for controlling said craft in elevation to reduce said difference substantially to zero.

2. The system of claim 1 wherein the second computing means includes means for limiting the rate of generation of the fifth signal to a maximum value dependent upon the altitude of the craft.

3. The system of claim 1 wherein the second computing means includes means operable to interrupt its response to the third and fourth signals and render it responsive to the first signal for providing an output that continuously nulls the output of the control signal providing means.

4. The system of claim 3 wherein the barometric sensing means includes means adapted to be operated simultaneously with the operation of the operable means of the second computing means for arranging said barometric means to provide an additional signal proportional to changes thereafter occurring in the craft's altitude, and means connecting said barometric means to the control signal responsive means so that the elevation of the craft is controlled by said additional signal to restore said craft to the altitude thereof from which said changes occur.

5. In an aircraft having signal-responsive elevation control apparatus, a terrain clearance control system comprising barometric sensing means responsive to the difference between a reference static air pressure and the static air pressure existing at the terrain clearance of said craft for providing a first signal proportional to the altitude of said craft with respect to the altitude at which said reference static air pressure is obtained, radio means for providing a second signal proportional to said terrain clearance of said craft, means responsive to said first and second signals for providing a third signal proportional to the altitude of said terrain with respect to said altitude at which said reference static air pressure is obtained, command means for providing a fourth signal proportional to a commanded terrain clearance for said craft, means responsive to said third and fourth signals for providing a fifth signal proportional to the sum of said terrain altitude and said commanded terrain clearance, and means connected to said barometic sensing means and said fifth signal providing means for generating a control signal for said elevation control apparatus proportional to the difference between said craft altitude and said sum of said terrain altitude and said commanded terrain clearance, whereby said craft is controlled in elevation to reach and maintain said commanded terrain clearance.

6. In an aircraft having signal-responsive elevation control apparatus, a terrain clearance control system comprising barometric means for providing a signal proportional to the pressure altitude of said craft above the pressure altitude of sea level, radio means for providing a signal proportional to the terrain clearance of said craft, means responsive to said signals provided by said barometric and radio means for generating a signal according to the height of said terrain above said sea level pressure altitude, means for providing a terrain clearance command signal according to a terrain clearance desired for said craft, means responsive to said terrain height signal and said terrain clearance command signal for generating a pressure altitude command signal according to the pressure altitude above said sea level pressure altitude corresponding to said desired terrain clearance, and means connected to said pressure altitude command signal generating means and said barometric means for providing a control signal for said elevation control apparatus according to the difference between the pressure altitude commanded and said pressure altitude of said craft, whereby the elevation of said craft is controlled so that the craft's terrain clearance is changed to said desired terrain clearance.

7. A flight control system for controlling an aircraft to attain a preselected clearance from the earth's surface and to thereafter maintain said preselected clearance, said system comprising barometric sensing means for providing a first signal proportional to the altitude of said craft above apparent sea level, said apparent sea level differing from actual sea level according to deviations in local atmospheric pressure from a given reference pressure for said barometric means, radio means for providing a second signal proportional to the clearance of said craft from the earth's surface, first computing means having a first mode of operation in which it responds to said first and second signals for providing a third signal proportional to the altitude of the earth's surface above said apparent sea level, said first computing means having a second mode of operation in which said third signal is prevented from departing from the value thereof existing when said second mode is entered, means for providing a fourth signal proportional to said preselected clearance, second computing means responsive to said third and fourth signals for providing a fifth signal proportional to the sum of the earth's surface altitude represented by said third signal and said preselected clearance, means connected to said barometric sensing means and said second computing means for providing a control signal proportional to the difference between said craft altitude and said sum of surface altitude and clearance, means responsive to said control signal for controlling said craft in elevation to reduce said difference substantially to zero, and mode selection means adapted to select the mode of operation of said first computing means, whereby said first computing means may be operated in its first mode from time to time sufficiently to correct said third signal for said deviations in local atmospheric pressure and be operated at all other times in its second mode so as to be unresponsive to possible erratic behavior of said second signal.

8. In an aircraft having signal-responsive elevation control apparatus, a terrain clearance control system comprising barometric means for providing a signal proportional to the pressure altitude of said craft above the pressure altitude of sea level, radio means for providing a signal proportional to the terrain clearance of said craft, means responsive to said signals provided by said barometric and radio means for generating a signal according to the height of said terrain above said sea level pressure altitude, means for providing a terrain clearance command signal according to a terrain clearance desired for said craft, means responsive to said terrain height signal and said terrain clearance command signal for generating a pressure altitude command signal according to the pressure altitude above said sea level pressure altitude corresponding to said desired terrain clearance, said pressure altitude command signal generating means including means for limiting the rate at which said pressure altitude command signal is generated to a limit value dependent upon the instantaneous level of said pressure altitude command signal, and means connected to said pressure altitude command signal generating means and said barometric means for providing a control signal for said elevation control apparatus according to the difference between the pressure altitude commanded and said pressure altitude of said craft, whereby the elevation of said craft is controlled so that the craft's terrain clearance is changed to said desired terrain clearance at a rate of change of pressure altitude dependent upon said commanded pressure altitude.

9. The terrain clearance control system of claim 8 wherein the terrain height signal generating means includes means actuable to interrupt the response of said generating means so as to maintain the terrain height signal at the value thereof existing when said interrupting means is actuated, whereby to effectively remove the radio means from the system and to employ the then existing pressure altitude of sea level in generating the pressure altitude command signal.

10. An aircraft flight control system comprising barometric means for providing a signal proportional to the pressure altitude of said craft above the pressure altitude of sea level, radio means for providing a signal proportional to the terrain clearance of said craft, first signal combining means connected to said barometric and radio means for providing a signal proportional to the terrain height above said sea level pressure altitude, first signal reproducing means connected to said first combining means for gradually reproducing the signal output of said first combining means at a rate dependent upon the level of such output, clearance programming means for providing a first command signal proportional to the terrain clearance desired for said craft, second signal combining means connected to said first signal reproducing means and said clearance programming means for providing a second command signal proportional to the sum of said desired terrain clearance and the terrain height represented by the signal output of said first reproducing means, whereby said second command signal is proportional to the pressure altitude corresponding to the terrain clearance of said first command signal, second signal reproducing means connected to said second combining means for gradually reproducing said second command signal at a rate directly in accordance with the difference between said second command signal and the output of said second reproducing means up to and including a limit value for said difference dependent upon the pressure altitude represented by the output of said second signal reproducing means, said rate being in accordance with said limit value when said second command signal exceeds said value, means connected to said second reproducing means and said barometric means for providing a control signal according to the difference between said pressure altitude of said craft and said pressure altitude represented by the output of said second signal reproducing means, and means for maneuvering said craft to maintain said control signal at a null, whereby said craft is controlled so that its terrain clearance changes to said desired terrain clearance at a rate of change of pressure altitude dependent upon said rate at which said second command signal is reproduced.

11. An aircraft flight control system comprising barometric sensing means for providing a signal proportional to the pressure altitude of said craft above the pressure altitude of sea level, radio means for providing a signal proportional to the terrain clearance of said craft, a negative feedback servo loop including an amplifier, motor, and a position feedback signal generator driven by said motor and connected to said amplifier to complete said loop, means for subtracting the signal outputs of said barometric sensing means and said radar means and supplying the resultant signal proportional to the height of said terrain above the pressure altitude of sea level to the input of said amplifier so that said signal generator is driven until said position feedback signal is proportional to said terrain height, means for supplying a command signal proportional to the terrain clearance desired for said craft, means for combining the signal outputs of said command signal supplying means and said position feedback signal generator to provide a pressure altitude command signal corresponding to said terrain clearance command signal, means connected to said combining means for gradually reproducing said pressure altitude command signal at a rate directly in accordance with the difference between said pressure altitude of the craft and the pressure altitude of said pressure altitude command signal up to and including an adjustable limit for said difference, said rate being directly in accordance with said limit when said difference exceeds said limit, said reproducing means including means for adjusting said limit inversely in accordance with the output of said signal reproducing means, means for subtracting the signal outputs of said reproducing means and said barometric sensing means for providing a control signal, and means responsive to said control signal for maneuvering said craft to seek a pressure altitude at which said control signal is reduced to a null.

No references cited.